United States Patent
Small et al.

(10) Patent No.: US 6,797,180 B2
(45) Date of Patent: Sep. 28, 2004

(54) DEWATERING SAND WITH SURFACTANTS

(75) Inventors: Terrence P. Small, Downington, PA (US); Donald C. Roe, Jamison, PA (US); William Wendel, Villanova, PA (US)

(73) Assignee: GE Betz, Inc., Trevose, PA (US)

( * ) Notice: Subject to any disclaimer, the term of this patent is extended or adjusted under 35 U.S.C. 154(b) by 142 days.

(21) Appl. No.: 10/136,174

(22) Filed: May 1, 2002

(65) Prior Publication Data

US 2003/0209503 A1 Nov. 13, 2003

(51) Int. Cl.$^7$ .................................................. C02F 11/14
(52) U.S. Cl. ........................ 210/729; 209/5; 210/732; 210/747; 210/770; 210/778
(58) Field of Search ................. 209/5; 210/725, 210/727, 728, 729, 732, 770, 772, 777, 778, 747; 252/60, 61

(56) References Cited

U.S. PATENT DOCUMENTS

| | | | | |
|---|---|---|---|---|
| 4,039,466 A | * | 8/1977 | Matsuda et al. | 252/194 |
| 4,410,431 A | * | 10/1983 | Roe | 210/728 |
| 4,447,344 A | * | 5/1984 | Roe | 252/60 |
| 4,897,201 A | * | 1/1990 | Yamamoto et al. | 210/729 |
| 5,048,199 A | * | 9/1991 | Cole | 34/349 |
| 5,248,420 A | | 9/1993 | Calmes et al. | 210/256 |
| 5,458,776 A | | 10/1995 | Preisser et al. | 210/378 |
| 5,545,332 A | * | 8/1996 | Koester et al. | 210/729 |
| 5,670,056 A | * | 9/1997 | Yoon et al. | 210/728 |

* cited by examiner

Primary Examiner—Peter A. Hruskoci
(74) Attorney, Agent, or Firm—Duane Morris LLP

(57) ABSTRACT

Methods of enhancing the dewatering of sand are disclosed. The methods include adding an anionic or nonionic surfactant to the wet sand prior to dewatering.

11 Claims, No Drawings

DEWATERING SAND WITH SURFACTANTS

FIELD OF THE INVENTION

The present invention relates to a method for enhancing the dewatering of sand through the use of various surfactants.

BACKGROUND OF THE INVENTION

Crushed aggregate materials, such as sand or slag, and other materials which are handled as slurries, must be dewatered prior to subsequent handling.

Sand mines throughout the world process sand in a similar manner. A wet process is used to extract sand from the mine, and the sand is pumped to a processing facility. At the processing facility, sand and water are separated, and the sand is sized. Sand and water (about 85% solids) is then transported to a stockyard for storage and drying. Typically, a 15,000 ton sand pile drains down to about 3.5% moisture over about a 15 day period. The sand is processed in a furnace to evaporate the moisture to about 0.1%. Energy efficiency and productivity are important considerations in the mining industry.

SUMMARY OF THE INVENTION

The present invention provides a process to enhance the removal of water from wet sand in a sand dewatering operation. The present inventors discovered that the addition of an anionic or nonionic surfactant to a sand slurry prior to dewatering significantly reduced sand moisture after stack out.

DESCRIPTION OF THE PREFERRED EMBODIMENTS

The present inventors discovered that surfactants and more particularly anionic or nonionic surfactants enhance the dewatering of sand in industrial processing operations. Through the use of the treatment of the present invention, both energy consumption and dryer load are significantly reduced. In testing of the present invention, energy consumption decreased from about 2 therms per ton down to about 1.1 therms per ton of sand, with dryer capacity increasing by about 40%. Note that the treatment of the present invention has additional advantages, in that it does not affect the dryer by sticking to the surfaces, and does not affect the final product. Treatment amounts of from about 1–150 ppm of the surfactant are preferably added to the sand slurry prior to dewatering, with amounts of from about 10–50 ppm particularly preferred.

Anionic surfactants which are effective for purposes of the present invention include sulfosuccinates (e.g., sodium dioctyl sulfosuccinate) and sulfonates (e.g., sodium dodecylbenzene sulfonate). Nonionic surfactants which are effective for purposes of the present invention include alkyl phenols (e.g., a polyethylene nonyl phenol or a polyethylene nonyl phenol/polyethylene oxide octylphenol), block copolymers (e.g., polyoxyethylene polyoxypropylene polymers), and glycol esters (e.g., polyoxyethylene glycol dioleates).

EXAMPLES

In the testing of the present invention, the goal was to evaluate the surfactant blends which would increase sand drainage, thereby reducing the drying time and energy consumption of the mine. Sand and water were obtained from an East Coast mining facility. The testing procedure was as follows: about 100 grams of sand and about 40 grams of water were added to a 100 ml beaker. A 500 ml beaker was then weighed, which was used to hold the sieve in the centrifuge, and catch the draining water. The slurry of sand and water was mixed, and the treatment of the present invention added, based on the 140 gram slurry. While stirring, the slurry was poured into a steel sieve which was placed onto the beaker. A parafilm was then placed over the sieve with the slurry, and the beaker-sieve placed into a centrifuge basket. After centrifuging, the beaker-sieve was removed from the basket, and the sieve removed from the plastic beaker.

The plastic beaker with the drained water was then weighed. This provided an estimation of the amount of water removed. A pan was then weighed; the sand was removed from the sieve, and the pan was again weighed with the sand present. The pan was then placed in an oven overnight at 60–70° C. for 18 to 20 hours; in additional testing, the pan was placed for two hours in a vacuum oven set to 15 in Hg at 60–70° C. The pan was then removed from the oven, cooled and weighed. The percent moisture drained and percent moisture dried were then calculated, with the percent moisture dried equal to:

$$\frac{(\text{pan} + \text{wet sand}) - (\text{pan} + \text{dry sand})}{(\text{pan} + \text{wet sand}) - \text{pan}} \times 100$$

The results, as shown in Table 1 below, demonstrate the efficacy of the particular treatments of the present invention.

TABLE 1

Moisture Reduction as a Function of Treatment Dosage

| Treatment | Dosage (ppm) | Total Moisture Reduction (%) |
| --- | --- | --- |
| Control | 0 | 0 |
| A | 50 | 30 |
| A | 100 | 50 |
| A | 150 | 60 |
| B | 50 | 28 |
| B | 100 | 50 |
| B | 150 | 52 |
| C | 50 | 35 |
| C | 100 | 48 |
| C | 150 | 42 |
| D | 50 | 65 |
| D | 100 | 70 |
| D | 150 | 70 |
| E | 50 | 5 |
| E | 100 | 30 |
| E | 150 | 40 |
| F | 50 | 30 |
| F | 100 | 60 |
| F | 150 | 65 |
| G | 50 | 35 |
| G | 100 | 40 |
| G | 150 | 40 |
| H | 50 | 58 |
| H | 100 | 60 |
| H | 150 | 65 |

Treatments (as actives in parentheses)
A: Sodium dioctyl sulfosuccinate (45%)
B: Polyethylene nonyl phenol (42.5%)
C: Sodium Dioctyl Sulfosuccinate (70%)
D: Polyethylene nonyl phenol (70%)/Polyethylene oxide octylphenol ether (30%)
E: Polyethylene nonyl phenol (10%)
F: Sodium dodecylbenzene sulfonate (100%)
G: Polyoxyethylene polyoxypropylene polymer (62%)
H: Polyoxyethylene glycol dioleate (40%)

Sand stockpile drying time is typically between about 5 and 14 days (depending on e.g., shipping volumes, stockpile tower capacities and other operating parameters). Dryer feed moistures are weather dependent, and generally range from about 2.25% to about 4.5%. Sand facilities attempt to achieve dryer feed moistures of about 3% or less, in order to control drying fuel consumption.

In further testing of the present invention, a mixer was used to prepare five indoor test samples (each five gallons in size) at a 75% solid solution of sand, taken from a drain stockpile. The particular treatment (as noted above) was mixed into four of the five test samples at 25 ppm and 50 ppm concentration levels; a fifth, untreated sample was used as a control. All five samples were suspended in porous weave, poly-mesh bags. Moisture levels of sand were then measured, with the sand collected from the same level within each bag, at equal drain time intervals. The moisture levels of the four treated samples were then compared to the fifth untreated sample. The results as shown in Table 2 indicate that the treatments of the present invention reduce the moisture to levels of about 1% (in Tables 2 and 3, moisture levels represented as "% Moist").

TABLE 2

Dewatering Tests

| Treatment | Treatment Rate ppm | Start Test % Moist | 1 Day % Moist | 1.8 Days % Moist | 3.8 Days % Moist | 6.3 Days % Moist | 15.4 Days % Moist |
|---|---|---|---|---|---|---|---|
| no treatment | 0 | 25 | 5.1 | 4 | 3 | 3.1 | 3 |
| treatment D | 25 | 25 | 4.5 | 4.1 | 2.8 | 3 | 1.1 |
| treatment D | 50 | 25 | 4.2 | 2.7 | 2.2 | 2.4 | 1.3 |
| treatment A | 25 | 25 | 4.8 | 4.1 | 4.4 | 3.7 | 1.9 |
| treatment A | 50 | 25 | 4.7 | 4.9 | 4.7 | 3.1 | 1.5 |

In additional testing of the present invention, a cement mixer was used to prepare three outdoor drain piles (one ton) at a 75% solid solution. Treatment D was mixed at 50 ppm and 100 ppm concentration levels in the mixer, prior to making a pile. A probe was used to collect sand from the center of each pile, and moistures were measured at the top and base of each test pile at equal drain-time intervals. The test results are shown in Table 3, below. These results demonstrate that the treatment at 50 and 100 ppm concentration levels produce significant moisture reductions for both short and long drain intervals.

TABLE 3

Dewatering Tests: One Ton Sand Piles

| Test Interval in Days 1 ton pile test | Start Test % Moist | Day 1 % Moist | Day 2 % Moist | Day 3 % Moist | Day 4 % Moist | Day 5 % Moist | Day 6 % Moist | Day 10 % Moist |
|---|---|---|---|---|---|---|---|---|
| control | 25 | 19.7 | 11.6 | 9.1 | 11.3 | 8.6 | 5.8 | 4.1 |
| 50 ppm | 25 | 2.8 | 1.7 | 3.3 | 2.1 | 2.8 | 1.9 | 1.1 |
| 100 ppm | 25 | 6.8 | 5.3 | 3.9 | 5.3 | 2.5 | 1.9 | 1.2 |

While this invention has been described in terms of exemplary embodiments, it is not limited thereto. Rather, the appended claims should be construed broadly to include other variants and embodiments of the invention which may be made by those skilled in the art without departing from the scope and range of equivalents of the invention.

We claim:

1. A method of enhancing the dewatering of a slurry of sand and water which comprises adding to the sand slurry, prior to dewatering, from about 1–150 ppm of an anionic or nonionic surfactant, transporting the slurry to a drain stockpile, and dewatering said slurry by draining water from said stockpile.

2. The method as recited in claim 1 wherein said anionic surfactant is a sulfosuccinate or a sulfonate.

3. The method as recited in claim 1 wherein said sulfosuccinate is sodium dioctyl sulfosuccinate.

4. The method as recited in claim 1 wherein said sulfonate is sodium dodecylbenzene sulfonate.

5. The method as recited in claim 1 wherein said nonionic surfactant is an alkyl phenol.

6. The method as recited in claim 5 wherein said alkyl phenol is a polyethylene nonyl phenol or a polyethylene nonyl phenol/polyethylene oxide octylphenol.

7. The method as recited in claim 1 wherein said nonionic surfactant is a block copolymer.

8. The method as recited in claim 7 wherein said block copolymer is a polyoxyethylene polyoxypropylene polymer.

9. The method as recited in claim 1 wherein said nonionic surfactant is a glycol ester.

10. The method as recited in claim 9 wherein said glycol ester is a polyoxyethylene glycol dioleate.

11. The method as recited in claim 1 wherein from about 10–50 ppm of the anionic or nonionic surfactant is added to the sand slurry prior to dewatering.

* * * * *